(12) United States Patent
Sallam (10) Patent No.: US 7,334,163 B1
(45) Date of Patent: Feb. 19, 2008

(54) DUPLICATING HANDLES OF TARGET PROCESSES WITHOUT HAVING DEBUG PRIVILEGES

(75) Inventor: Ahmed Sallam, Los Angeles, CA (US)

(73) Assignee: Symantec Corporation, Cupertino, CA (US)

( * ) Notice: Subject to any disclaimer, the term of this patent is extended or adjusted under 35 U.S.C. 154(b) by 610 days.

(21) Appl. No.: 10/870,785

(22) Filed: Jun. 16, 2004

(51) Int. Cl.
*G06F 11/00* (2006.01)

(52) U.S. Cl. ............................... 714/38; 726/2; 726/27
(58) Field of Classification Search ................... 714/38; 726/2
See application file for complete search history.

(56) References Cited

U.S. PATENT DOCUMENTS

| | | | |
|---|---|---|---|
| 4,776,537 A | 10/1988 | Garside et al. | |
| 4,888,798 A | 12/1989 | Earnest | |
| 5,050,212 A | 9/1991 | Dyson | |
| 5,103,476 A | 4/1992 | Waite et al. | |
| 5,182,770 A | 1/1993 | Medveczky et al. | |
| 5,432,851 A | 7/1995 | Scheidt et al. | |
| 5,450,576 A | 9/1995 | Kennedy | |
| 5,530,757 A | 6/1996 | Krawczyk | |
| 5,548,532 A | 8/1996 | Menand et al. | |
| 5,564,054 A | 10/1996 | Bramnick et al. | |
| 5,596,711 A | 1/1997 | Burckhartt et al. | |
| 5,606,609 A | 2/1997 | Houser et al. | |
| 5,625,693 A | 4/1997 | Rohatgi et al. | |
| 5,661,848 A | 8/1997 | Bonke et al. | |
| 5,706,499 A * | 1/1998 | Kleewein et al. ............. | 707/10 |
| 5,708,776 A | 1/1998 | Kikinis | |
| 5,765,151 A * | 6/1998 | Senator .......................... | 707/8 |
| 5,799,088 A | 8/1998 | Raike | |
| 5,802,080 A | 9/1998 | Westby | |
| 5,854,759 A | 12/1998 | Kaliski, Jr. | |
| 5,922,072 A | 7/1999 | Hutchinson et al. | |

(Continued)

FOREIGN PATENT DOCUMENTS

EP          0858031 A1     8/1998

(Continued)

OTHER PUBLICATIONS

Richter, J., Microsoft.com web pages (online), "Design a Windows NT Service to Exploit Special Operating System Facilities", Oct. 1997 (retrieved Aug. 29, 2003). Retrieved from the Internet: <URL: http://www.microsoft.com/msj/1097/winnt.aspx.

(Continued)

*Primary Examiner*—Yolanda L Wilson
(74) *Attorney, Agent, or Firm*—Fenwick & West LLP (57) ABSTRACT

A source process duplicates handles owned by a target process, without the source process having debug privileges. A handle duplication manager running in kernel space receives requests from source processes for duplicates of handles owned by remote target processes. In response to a request, the handle duplication manager accesses address space of a target process, and calls a system object duplication function with a request to duplicate the requested handle(s) of the target process. The handle duplication manager running in kernel space calls the system function so as to simulate the origin of the call as being the target process running in user space. The duplication manager receives the requested duplicate handle(s) from the system function, and returns them to the requesting source process.

25 Claims, 5 Drawing Sheets

U.S. PATENT DOCUMENTS

| | | | |
|---|---|---|---|
| 5,956,475 A | 9/1999 | Burckhartt et al. | |
| 5,974,546 A | 10/1999 | Anderson | |
| 6,000,032 A | 12/1999 | Millard | |
| 6,014,744 A | 1/2000 | McKaughan et al. | |
| 6,014,767 A | 1/2000 | Glaise | |
| 6,048,090 A | 4/2000 | Zook | |
| 6,061,788 A | 5/2000 | Reynaud et al. | |
| 6,079,016 A | 6/2000 | Park | |
| 6,574,734 B1 * | 6/2003 | Colson et al. | 726/21 |
| 6,678,822 B1 * | 1/2004 | Morar et al. | 713/182 |
| 7,073,059 B2 * | 7/2006 | Worely et al. | 713/168 |
| 7,162,743 B1 * | 1/2007 | Bolding et al. | 726/27 |
| 2003/0056112 A1 * | 3/2003 | Vinson et al. | 713/200 |

FOREIGN PATENT DOCUMENTS

| | | |
|---|---|---|
| WO | WO 93/25024 A1 | 12/1993 |
| WO | WO 95/15522 A1 | 6/1995 |
| WO | WO 95/22794 A1 | 8/1995 |

OTHER PUBLICATIONS

McNamara, John E., "Technical Aspects of Data Communication", 2ed. 1982, Digital Equipment Corporation, U.S.A. pp. 110-122.

Ore, Oystein, "Number Theory and Its History", 1976 Gudron Ore, U.S.A. pp. 124-129.

Schneier, Bruce, "Applied Cryptography", 2ed. 1996, Bruce Schneier, U.S.A. pp. 436-441.

Nair, et al., "A Symbol Based Algorithm for Hardware Implementation of Cycle Redundancy Check", IEEE, 1997. USA.

"PC Medic 97 User's Guide", McAfee Associates, Inc., issued Mar. 1997, pp. 1-60, USA.

"Norton Utilities for Windows User's Guide—Version 2.0", Symantec, 1995. USA.

* cited by examiner

DUPLICATING HANDLES OF TARGET
PROCESSES WITHOUT HAVING DEBUG
PRIVILEGES

TECHNICAL FIELD

This invention pertains generally to Microsoft Windows® operating system internals, and more specifically to duplicating handles of remote target processes without having debug privileges.

BACKGROUND

It has become a common approach to write programs for 32 bit versions of Microsoft Windows® (e.g., NT, 2000, XP, 2003) that remotely control the operations and behaviors of other running Windows processes. There are various existing applications that utilize this feature provided by the Windows NT based operating systems. For instance, a SPAM blocker program may remotely inject a dynamic link library into the address space of another Windows application, filter all the web and e-mail traffic, and block SPAM based e-mail.

Typically, the mechanism for remotely controlling an application is to inject code bytes into the address space of the target process, and then to create a remote thread that executes those code bytes. Jeffrey Richter, in his book *Programming Applications for Microsoft Windows* (Fourth Edition) articulates detailed implementation mechanics for this known technique.

However, the known methods for remotely controlling processes all have certain security requirements that are dictated by Windows. In particular, the program that is to remotely control the target process must have very specific and extensive access rights to the remote process space, in order to write the code bytes thereto. If the access token of the target process does not allow the calling process to obtain those access rights, then the write operation will fail. Thus, the controlling process must be run from a highly privileged user account. Normally, this is done by registering the controlling process as a service that runs in the local system account.

Additionally, for the controlling process to be able to create a remote thread inside the target process, it has to have debug privilege, in order to be able to access the process handle of the target process. By default, Windows allows only system administrators to have debug privilege. This additional security measure started with Windows 2003, in order to provide process level protection against debug attachment commands, and against creation of threads remotely by another process. Certain user accounts such as the local system account have this built in system level protection. There is no known user mode based solution by which a program without debug privilege can obtain a process handle. Furthermore, being able to access and duplicate other handles owned by the target process (e.g., a pipe handle, a time handle) without having debug privileges would be of further use to the source process in controlling the target process, or for other purposes.

What is needed are methods, systems and computer readable media for duplicating handles of remote target processes, without requiring the source process to be run from a highly privileged user account, and without requiring the source process to have debug privilege.

SUMMARY OF INVENTION

The present invention comprises methods, systems and computer readable media for a source process to duplicate handles owned by a target process, without the source process having debug privileges. In some embodiments of the present invention, a handle duplication manager running in kernel space receives requests from source processes for duplicates of handles owned by remote target processes. In response to a request, the handle duplication manager accesses address space of a target process, and calls a system object duplication function with a request to duplicate the requested handle(s) of the target process. The handle duplication manager running in kernel space calls the system function so as to simulate the origin of the call as being the target process running in user space. The duplication manager receives the requested duplicate handle(s) from the system function, and returns them to the requesting source process.

The features and advantages described in this disclosure and in the following detailed description are not all-inclusive, and particularly, many additional features and advantages will be apparent to one of ordinary skill in the relevant art in view of the drawings, specification, and claims hereof. Moreover, it should be noted that the language used in the specification has been principally selected for readability and instructional purposes, and may not have been selected to delineate or circumscribe the inventive subject matter, resort to the claims being necessary to determine such inventive subject matter.

The Figures depict embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Figure 1:
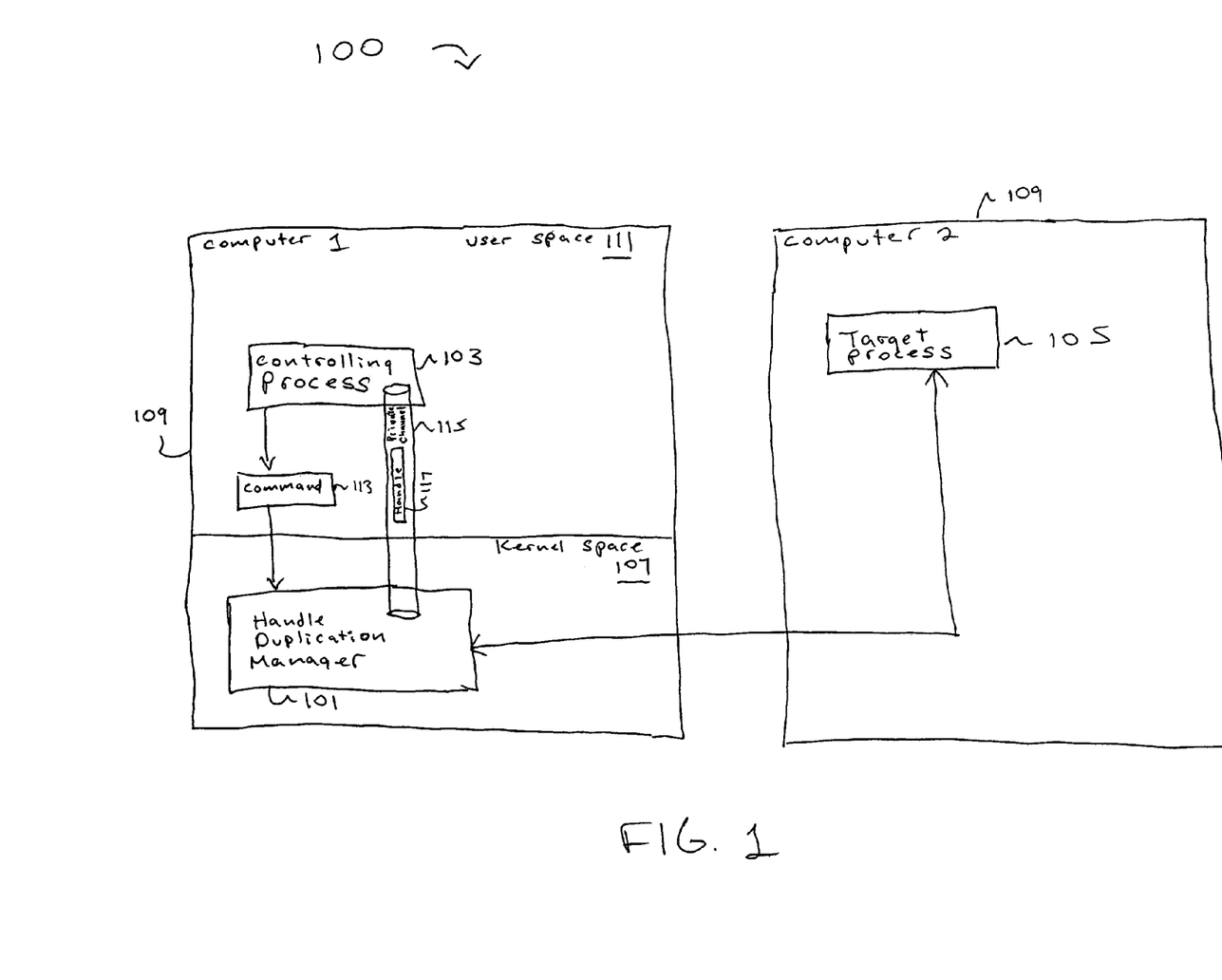
FIG. 1 is a block diagram illustrating a high level overview of a system for a source process to duplicate handles of remote target processes without having debug privileges, according to some embodiments of the present invention.

FIG. 1 illustrates a high level overview of a system 100 for performing some embodiments of the present invention. A handle duplication manager 101 enables a controlling process 103 to remotely access a target process 105, for example on a remote computer 109. Of course, the target process 105 need not be running on a physically remote computer 109, but instead can execute on the same computer 109 as the controlling process 103. It is to be understood that although the handle duplication manager 101 is illustrated as a single entity, as the term is used herein a handle duplication manager 101 refers to a collection of functionalities which can be implemented as software, hardware, firmware or any combination of the three. Where a handle duplication manager 101 is implemented as software, it can be implemented as a standalone program, but can also be implemented in other ways, for example as part of a larger program, as a plurality of separate programs, or as one or more statically or dynamically linked libraries.

In the embodiment illustrated in FIG. 1, the handle duplication manager 101 is instantiated in the form of a 32 bit Windows device driver. As illustrated, the handle duplication manager 101 executes as a device driver in the kernel space 107 of the computer 109 on which the controlling program 103 runs in user space 111. The controlling program 103 issues commands 113 to the handle duplication manager 101, which is programmed to support commands 113 (IO Control Codes) issued from controlling processes 103. Typically, the handle duplication manager 101 can support at least the following commands 113.

An IO Control Code ("IOCTL") to register the user mode controlling program 103. When the handle duplication manager 101 receives this IOCTL, it authenticates the calling process 103, verifying that it is receiving requests from the right user mode program 103. If the calling process 103 is authenticated, then the handle duplication manager 101 stores identification information concerning the calling process 103 (e.g., the process identifier), for example in a global memory structure inside the handle duplication manager 101.

An IOCTL to specify the process identifier(s) of the target process(es) 105, to which the controlling process 103 is requesting access (e.g., memory read, memory write, creation of remote threads, process termination, etc.).

An IOCTL to register a secure, private communication channel 115 between the user mode program 103 and the handle duplication manager 101. Through this channel 115, the handle duplication manager 101 can automatically deliver duplicated handle(s) 117 to the user mode program 103, once they are created.

In other embodiments of the present invention, more or fewer commands 113 are supported, as desired.

Figure 2:
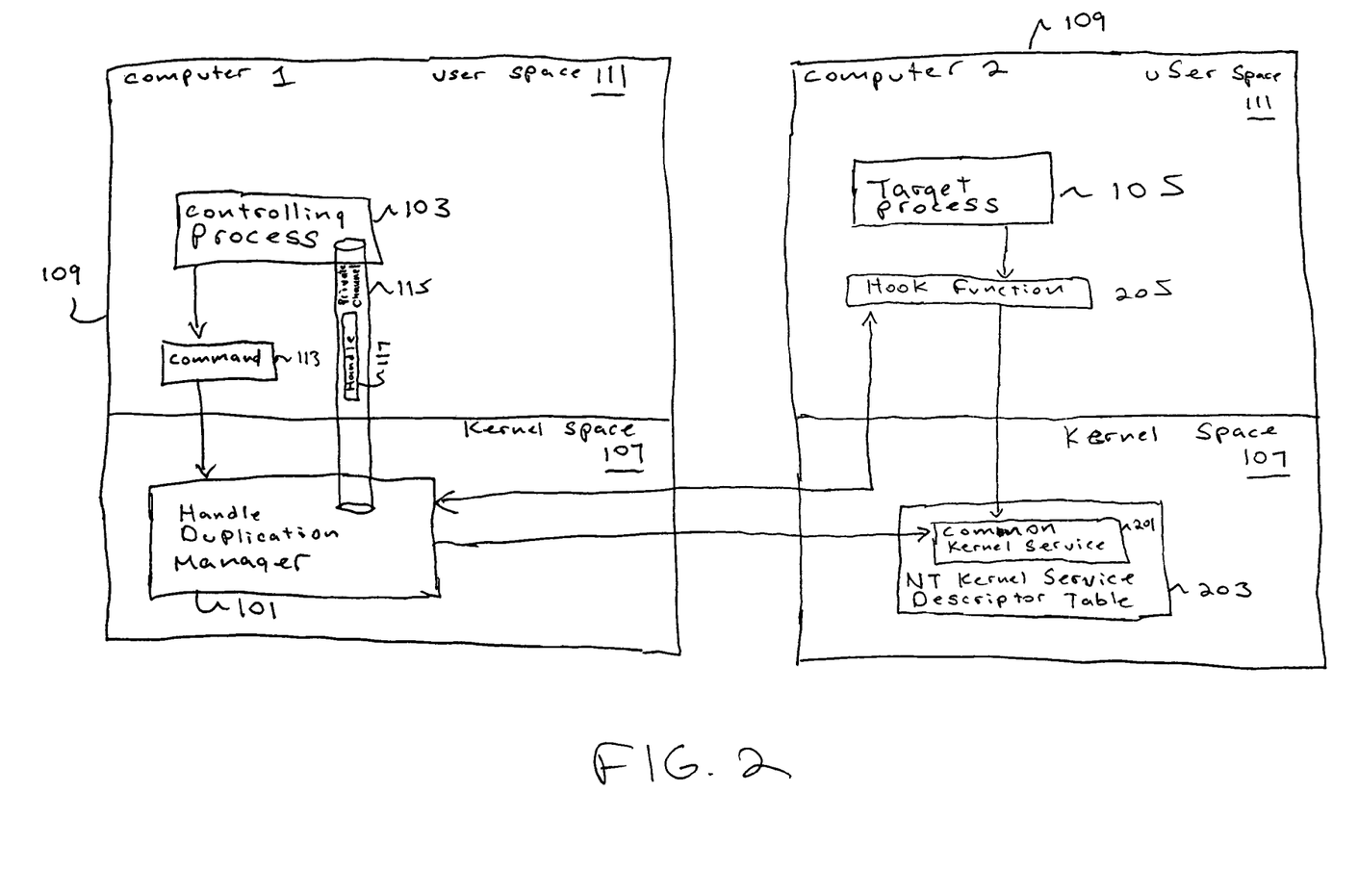
FIG. 2 is a block diagram illustrating a high level overview of the handle duplication manager accessing the address space of a target process by hooking a common NT kernel service, according to some embodiments of the present invention.

As explained in detail below, the handle duplication manager 101 is programmed to be able to access the address space of every target process 105, and simulate a process handle 117 duplication operation therefrom. Turning to FIG. 2, in one embodiment, the handle duplication manager 101 accesses the address space of a target process 105 by hooking a common NT kernel service 201 in the NT Kernel Service Descriptor Table 203. The implementation mechanics of hooking an NT kernel service 201 are known to those of ordinary skill in the relevant art. When the handle duplication manager's 101 hook function 205 is called, the handle duplication manager 101 compares the process identifier of the calling process 207 with the identifier(s) of the process(es) 105 that have been requested for remote access by the controlling process 103. If there is a match, the handle duplication manager 101 has identified a target process 105. The handle duplication manager 101 then accesses the address space of the target process 105 from the hook function 205, and starts the handle 117 duplication step for that target process 105. Otherwise the handle duplication manager 101 hook function 205 calls the original NT Service function 201, which proceeds normally.

One example of a common NT kernel service 201 to hook is ZwDeviceIoControlFile, which implements the communication between the Windows socket provider in user mode and the Windows Socket device driver in kernel mode. The determination of which kernel service to hook in kernel mode is a design choice, driven by, for example, the desired reason for the remote access. Some implementations may prefer to hook functions such as NtCreateFile or NtCreateThread, etc.

Figure 3:
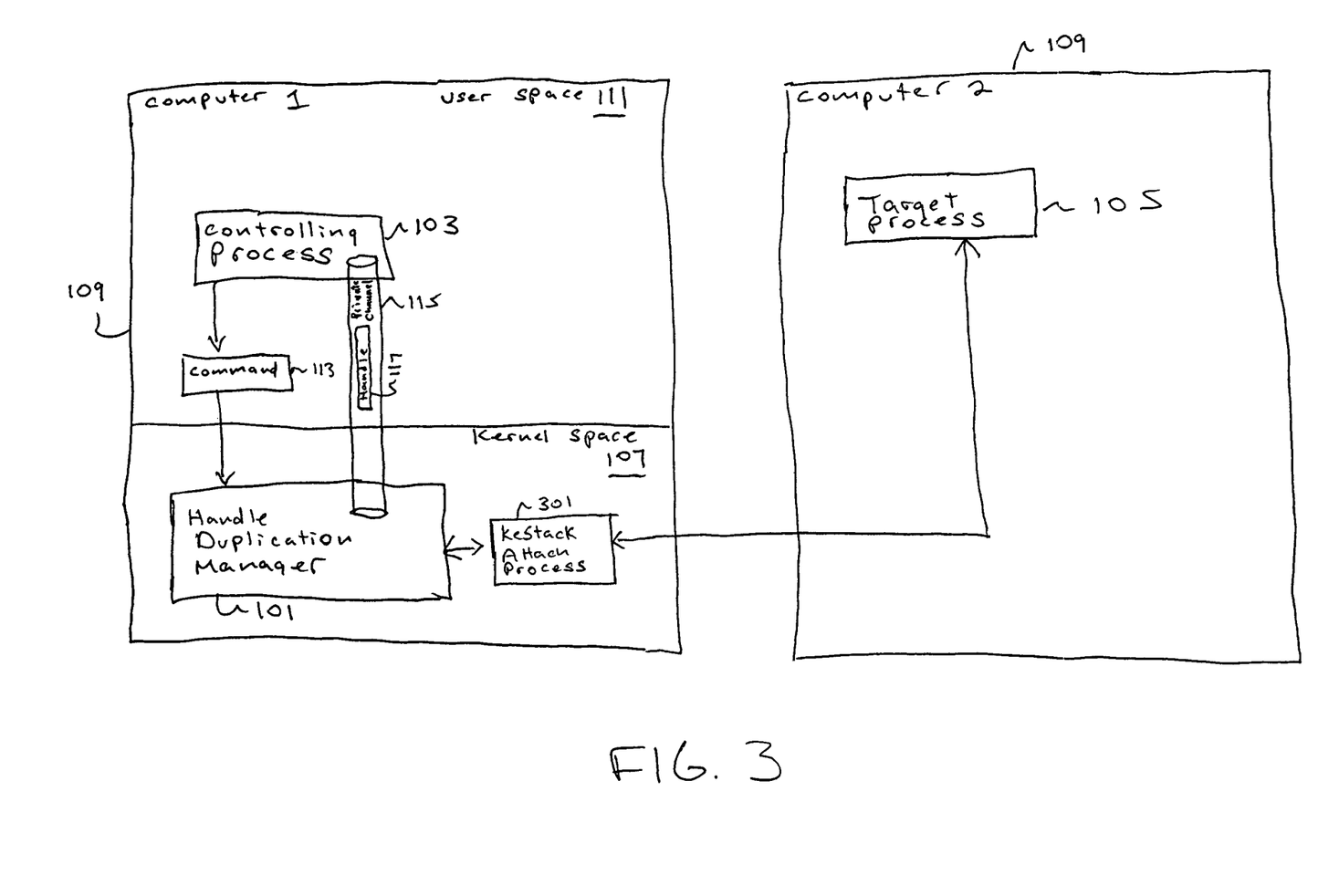
FIG. 3 is a block diagram illustrating a high level overview of the handle duplication manager accessing the address space of a target process by calling a function provided by the Windows NT Operating System Kernel, according to some embodiments of the present invention.

Turning now to FIG. 3, in another embodiment of the present invention the handle duplication manager 101 accesses the address space of a target process 105 by calling a function 301 provided by the Windows NT Operating System Kernel in order to attach to the address space of any running process. In Windows 2000, this NT kernel function is called KeStackAttachProcess 301, and it takes a pointer to KPROCESS structure as an input parameter. The handle duplication manager 101 can convert the process identifier of the target process 105 into a pointer to KPROCESS structure, and pass it to the KeStackAttachProcess 301. After accessing the address space of the target process 105, the handle duplication manager 101 can detach back to the original process context by calling KeUnstackDetachProcess before the handle 117 duplication step.

KeStackAttachProcess 301 is available only starting from Windows 2000, so the embodiment described in conjunction with FIG. 2 would typically be used with earlier versions of 32 bit Windows. Of course, in other versions of Windows, the name and/or definition of the function for attaching to the address space of a running process can vary. In general, this invention is in no way tied to any specification function names or exact calling parameters or the like. Specific functions discussed herein are based on current names and prototypes thereof. Callable code by any other name that enables such functionality is still within the scope of the present invention.

Figure 4:
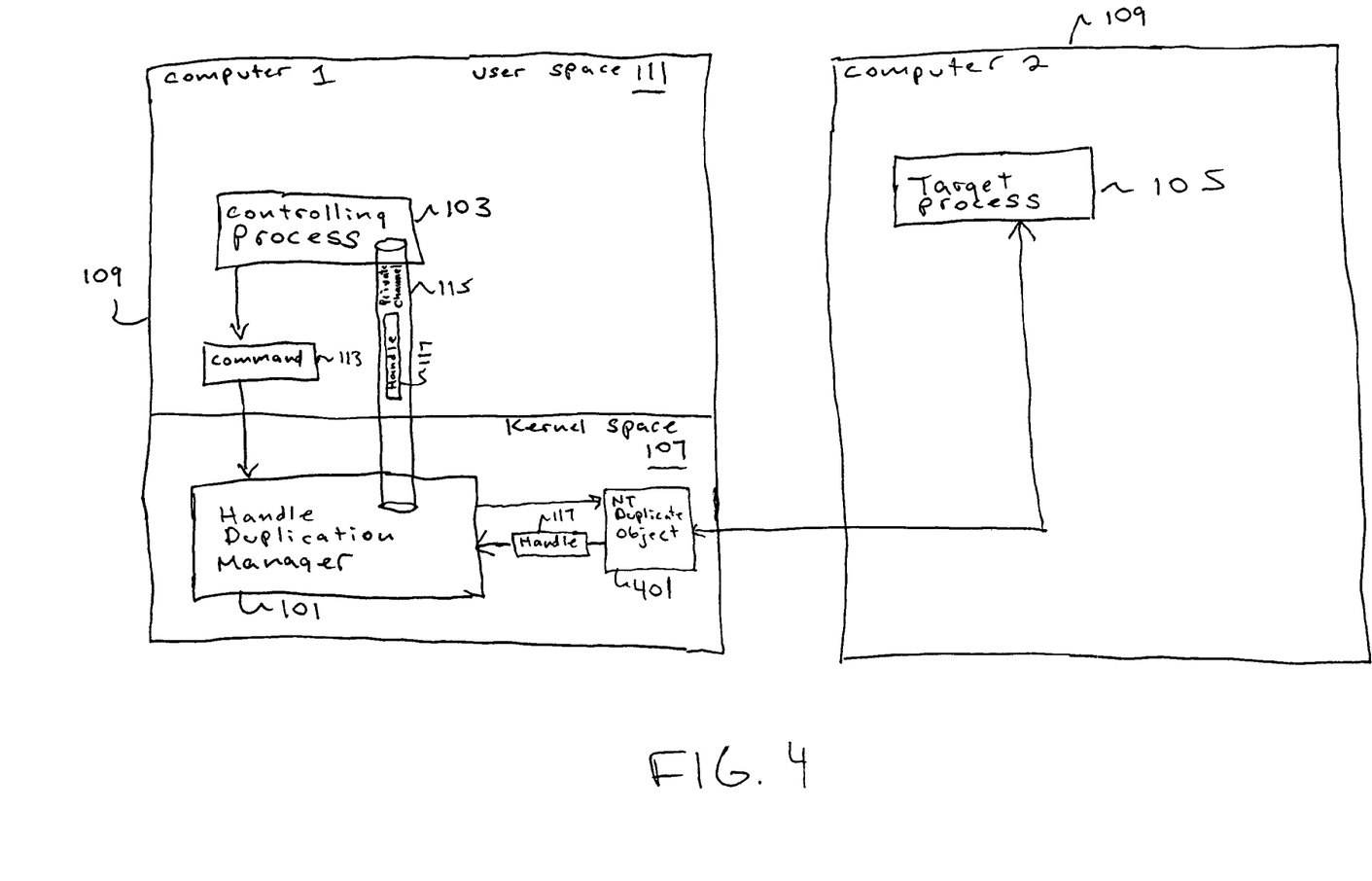
FIG. 4 is a block diagram illustrating a high level overview of the handle duplication manager duplicating a process handle without having debug privileges, according to some embodiments of the present invention.

Turning now to FIG. 4, the handle duplication manager 101 is illustrated duplicating the process handle 117 without having debug privileges, according to some embodiments of the present invention. In order to do so, the handle duplication manager 101 (running as a device driver in kernel mode) calls the NT kernel function NtDuplicateObject 401, in such a way as to simulate a call that has originated from the user mode target process 105. This allows the handle duplication manager 101 to duplicate the handle 117 of the target process 105 for the controlling process 103 to use. As explained below, the duplicated handle 117 is provided to the controlling process 103 with all the requested access rights, so that the controlling process 103 can remotely control the target process 105.

NtDuplicateObject 401 is the kernel side implementation of the user mode function DuplicateHandle. This function duplicates an object handle 117. The duplicated handle 117 refers to the same object as the original handle 117. Therefore, any changes to the object are reflected through both handles 117.

Table 1 illustrates the prototype of NtDuplicateObject 401.

TABLE 1

NtDuplicateObject (
    IN HANDLE SourceProcessHandle,

TABLE 1-continued

```
    IN HANDLE SourceHandle,
    IN HANDLE TargetProcessHandle OPTIONAL,
    OUT PHANDLE TargetHandle OPTIONAL,
    IN ACCESS_MASK DesiredAccess,
    IN ULONG HandleAttributes,
    IN ULONG Options
);
```

It is important not to confuse "target process" and "source process" as those terms are defined within the NtDuplicateObject 401 prototype with those terms as used within this specification. In this specification, the source process 103 is the process that will remotely control a remote process by having a process handle 117 to the remote process, the handle 117 being valid within the address space of the controlling process 103. The process which is controlled remotely is in turn referred to as the target process 105. Within the context of the NtDuplicateObject 401 function, the source process is the process that calls the function (actually, the function that NtDuplicateObject 401 thinks is calling, as the present invention simulates the identity of the caller) in order to have its handle 117 duplicated. Within the context of the NtDuplicateObject 401 function, the target process is the process that receives the new duplicated handle 117, valid for use within its own address space.

As the prototype shows, NtDuplicateObject 401 receives the following parameters:

1. A handle 117 to the process that NtDuplicateObject 401 calls the source process. In our case, this is the process from which we are simulating the call to NtDuplicateObject 401, which is the target process 105 that we want to control.
2. A handle 117 that NtDuplicateObject 401 calls the source handle 117, which is the handle 117 to be duplicated (i.e., the process handle 117 to the process 105 that we want to control).
3. A handle 117 to the process that NtDuplicateObject 401 calls the target process. In our case this is the controlling process 103.

Typically, the handle duplication manager 101 itself has only process identifiers for both the source process 103 and the target process 105, and therefore calls NtOpenProcess to obtain handles 117 to both processes.

4. A pointer to a double word location that will receive the value of the newly duplicated handle 117. This handle 117 is valid within the context of what NtDuplicateObject 401 calls the target process (our controlling process 103).
5. Desired access field. Typically, the handle duplication manager 101 specifies all possible process based access rights: PROCESS_TERMINATE, PROCESS_CREATE_THREAD, PROCESS_SET_SESSIONID, PROCESS_VM_OPERATION, PROCESS_VM_READ, PROCESS_VM_WRITE, PROCESS_DUP_HANDLE, PROCESS_CREATE_PROCESS, PROCESS_SET_QUOTA, PROCESS_SET_INFORMATION, PROCESS_QUERY_INFORMATION and PROCESS_SUSPEND_RESUME.

Those access rights allow the controlling process 103 to perform any possible operation on the target process 105. However, in some embodiments the handle duplication manager 101 requests only specific access rights that the user mode controlling program 103 requests, wherein the controlling program 103 only needs to perform certain types of operations.

6. The Handle Attribute and the Option fields are not of importance to the present invention, and the handle duplication manager 101 typically provides a zero value for both of them.

In order to simulate calling NtDuplicateObject 401 from the target process running in user space, the first trick is to call the "Nt" function and not the "Zw" function. Kernel functions are provided as both Nt functions, and Zw functions. Zw functions are provided for kernel mode device drivers, and Nt functions are provided for traffic coming from user mode programs. The Zw function makes the previous mode equal to kernel mode, and then calls the Nt function. The Nt function checks the previous mode, and if it is kernel mode it assumes that the caller is a device driver and thus does not validate received parameters. If the previous mode is user mode, then it assumes that the caller is a user mode program, in which case it validates the user mode buffers. In kernel more, user mode buffers are not trusted at all.

When the Nt function checks the previous mode to determine whether it needs to validate the received parameters, it assumes that the caller is a user mode program and not a device driver. Windows NT Device drivers call "Zw" functions which marks the previous mode to be kernel mode.

The second trick is that since the handle duplication manager 101 calls the Nt functions (NtOpenProcess and NtDuplicateObject) directly and not the "Zw" functions (ZwOpenProcess and ZwDuplicateObject), it passes in parameters that actually exist in user mode memory, and not in kernel mode memory. Otherwise, the "Nt" function will reject the call because the previous mode is user mode but the received parameters reside in kernel memory (the handle duplication manager's 101 memory). Therefore, before calling both the NtOpenProcess and the NtDuplicateObject functions, the handle duplication manager 101 allocates memory in the user mode address space of the process to be controlled by calling the ZwAllocateVirtualMemory function. Although ZwAllocateVirtualMemory itself allocates virtual memory in the process user space, it does not require its parameters to reside in user mode memory since it is the same function used by both kernel mode drivers and user mode programs to allocate user mode memory. Therefore, there are no checks inside the function on the memory location of the received parameters.

Once the controlling program 103 has the process handle 117 of the target process 105, the controlling program 103 can start a thread in the target process 105 address space, in order to execute the code bytes it inserted there, thereby remotely controlling the target process 105.

Although the invention is described above within the context of duplicating process handles 117, the invention is not so limited. The technique described is agnostic to the type of the handle 117 being duplicated, and can thus be used to grant the controlling process 103 access to any handle 117 owned by the target process 105. The present invention can, for example, enable the controlling process 103 to intercept intercommunication traffic by having access to sockets, named pipes, files, mail slots, ports and shared memory sections owned by the controlled process 105. The following types of handles 117 (objects) are examples of what can be duplicated by the present invention: access token, communications device, console input, console screen buffer, desktop, directory, event, file, file mapping, job, mailslot, mutex, pipe, process, registry key, semaphore, socket, thread, timer and window station.

Figure 5:
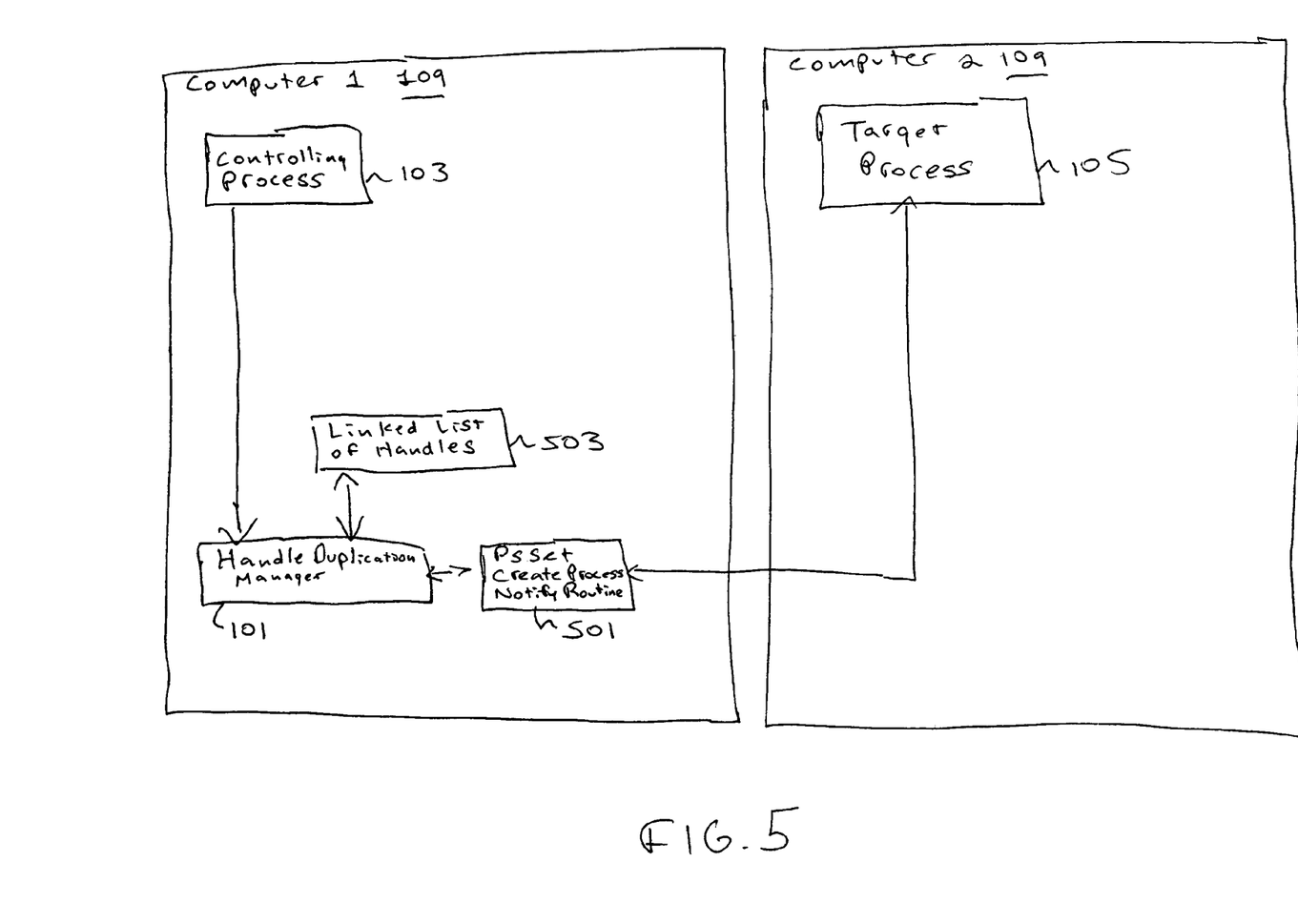
FIG. 5 is a block diagram illustrating a high level overview of the handle duplication manager enumerating all the handles owned by the target process, according to some embodiments of the present invention.

As illustrated in FIG. 5, in one embodiment the remote access manager 101 enumerates all the handles 117 owned by the target process 105, and the controlling process 103 specifies which handle(s) 117 it would like to access. This can be based on the name of the object that the handle 117 represents, such as the name of the memory mapped section, or it can be based on the type 117 of the handle object, such as named pipes, ports, etc.

The remote access manager 101 can leverage a kernel mode function called PsSetCreateProcessNotifyRoutine 501, which allows registration of a process creation/termination callback function. The remote access manager 101 calls this function and establishes a dynamic doubly linked list 503 (or other data structure) that contains identifiers of all currently running processes. The remote access manager 101 also uses NtQuerySystemInformation (not illustrated) to enumerate all the processes that have been loaded before the remote access manager 101, in such cases where remote access manager 101 was not loaded at system load time. The remote access manager 101 then supports a mode of operations where it automatically duplicates the handle 117 of all running processes and then keeps the duplicated handles 117 in the doubly linked list 503.

When the user mode controlling program 103 sends a request to duplicate a certain process handle 117, the remote access manager 101 tries first to locate the handle 117 from the linked list 503. If the duplicated handle 117 does not exist therein, then the remote access manager 101 obtains the handle 117 as described above.

This doubly linked list 503 is very useful in the generalized model, when the remote access manager 101 duplicates handles 117 of various types. For instance, the remote access manager 101 may hook NtCreateFile and automatically duplicate the file handle 117 after it is created and returned, and then keep the duplicated handle 117 in the linked list 503 node that corresponds to that process instance.

As will be understood by those familiar with the art, the invention may be embodied in other specific forms without departing from the spirit or essential characteristics thereof. Likewise, the particular naming and division of the modules, managers, features, attributes, methodologies and other aspects are not mandatory or significant, and the mechanisms that implement the invention or its features may have different names, divisions and/or formats. Furthermore, as will be apparent to one of ordinary skill in the relevant art, the modules, managers, features, attributes, methodologies and other aspects of the invention can be implemented as software, hardware, firmware or any combination of the three. Of course, wherever a component of the present invention is implemented as software, the component can be implemented as a script, as a standalone program, as part of a larger program, as a plurality of separate scripts and/or programs, as a statically or dynamically linked library, as a kernel loadable module, as a device driver, and/or in every and any other way known now or in the future to those of skill in the art of computer programming. Additionally, the present invention is in no way limited to implementation in any specific programming language, or for any specific operating system or environment. Accordingly, the disclosure of the present invention is intended to be illustrative, but not limiting, of the scope of the invention, which is set forth in the following claims.

What is claimed is:

1. A computer implemented method for duplicating at least one handle of at least one remote target process without having debug privileges, the method comprising the steps of:
   a handle duplication manager running in kernel space;
   the handle duplication manager accessing address space of a target process;
   the handle duplication manager calling a system object duplication function with a request to duplicate a handle of the target process, such that the call simulates origin from the target process; and
   the handle duplication manager receiving the requested duplicate handle.

2. The method of claim 1 further comprising:
   the handle duplication manager receiving a request from a source process for a duplicate handle of a target process; and
   the handle duplication manager returning the requested duplicate handle to the source process.

3. The method of claim 1 wherein the step of the handle duplication manager accessing address space of a target process further comprises:
   the handle duplication manager hooking a common kernel service;
   the handle duplication manager comparing process identifiers of processes calling the hooked service to a process identifier of the target process; and
   responsive to a call to the hooked service originating from the target process, the handle duplication manager accessing the address space of the target process from the hook function.

4. The method of claim 1 wherein the step of the handle duplication manager accessing address space of a target process further comprises:
   the handle duplication manager calling a system function to attach to the address space of a running process.

5. The method of claim 1 wherein the step of the handle duplication manager calling a system object duplication function such that the call simulates origin from the target process further comprises:
   the handle duplication manager allocating memory in the address space of the target process; and
   the handle duplication manager calling a version of the system object duplication function provided by the system for user mode programs, and passing parameters that exist in the allocated user mode memory to the system object duplication function.

6. The method of claim 1 wherein at least one duplicate handle is one from a group of handles consisting of:
   a process handle;
   an access token handle;
   a communications device handle;
   a console input handle;
   a console screen buffer handle;
   a desktop handle;
   a directory handle;
   an event handle;
   a file handle;
   a file mapping handle;
   a job handle;
   a mailslot handle;
   a mutex handle;
   a pipe handle;
   a registry key handle;
   a semaphore handle;
   a socket handle;
   a thread handle;
   a timer handle; and
   a window station handle.

7. The method of claim 1 wherein:
   the target process executes on a physically remote computer.

8. The method of claim 1 further comprising:
   the handle duplication manager enumerating all handles concerning at least one target process.

9. The method of claim 8 wherein the handle duplication manager enumerating all handles concerning at least one target process further comprises:
the handle duplication manager enumerating all handles concerning all running processes.

10. The method of claim 9 further comprising:
the handle duplication manager duplicating all handles concerning at least some running processes, and storing the duplicated handles in a data structure.

11. The method of claim 8 further comprising:
the handle duplication manager receiving a request from a source process for at least one duplicate handle of at least one target process; and
the handle duplication manager returning the at least one requested duplicate handle to the source process.

12. A computer readable medium containing a computer program product for duplicating at least one handle of at least one remote target process without having debug privileges, the computer program product comprising:
program code for accessing address space of a target process from kernel space;
program code for calling a system object duplication function with a request to duplicate a handle of the target process, such that the call simulates origin from the target process; and
program code for receiving the requested duplicate handle.

13. The computer program product of claim 12 further comprising:
program code for receiving a request from a source process for a duplicate handle of a target process; and
program code for returning the requested duplicate handle to the source process.

14. The computer program product of claim 12 wherein the program code for accessing address space of a target process further comprises:
program code for hooking a common kernel service;
program code for comparing process identifiers of processes calling the hooked service to a process identifier of the target process; and
program code for, responsive to a call to the hooked service originating from the target process, accessing the address space of the target process from the hook function.

15. The computer program product of claim 12 wherein the program code for accessing address space of a target process further comprises:
program code for calling a system function to attach to the address space of a running process.

16. The computer program product of claim 12 wherein the program code for calling a system object duplication function such that the call simulates origin from the target process further comprises:
program code for allocating memory in the address space of the target process; and
program code for calling a version of the system object duplication function provided by the system for user mode programs, and passing parameters that exist in the allocated user mode memory to the system object duplication function.

17. The computer program product of claim 12 further comprising:
program code for enumerating all handles concerning at least one target process.

18. The computer program product of claim 17 further comprising:
program code for receiving a request from a source process for at least one duplicate handle of at least one target process; and
program code for returning the at least one requested duplicate handle to the source process.

19. A computer system for duplicating at least one handle of at least one remote target process without having debug privileges, the computer system having a memory and comprising:
a software portion stored in the memory and configured to access address space of a target process from kernel space;
a software portion stored in the memory and configured to call a system object duplication function with a request to duplicate a handle of the target process, such that the call simulates origin from the target process; and
a software portion stored in the memory and configured to receive the requested duplicate handle.

20. The computer system of claim 19 further comprising:
a software portion stored in the memory and configured to receive a request from a source process for a duplicate handle of a target process; and
a software portion stored in the memory and configured to return the requested duplicate handle to the source process.

21. The computer system of claim 19 wherein the software portion configured to access address space of a target process further comprises:
a software portion stored in the memory and configured to hook a common kernel service;
a software portion stored in the memory and configured to compare process identifiers of processes calling the hooked service to a process identifier of the target process; and
a software portion stored in the memory and configured to access the address space of the target process from the hook function, responsive to a call to the hooked service originating from the target process.

22. The computer system of claim 19 wherein the software portion configured to access address space of a target process further comprises:
a software portion stored in the memory and configured to call a system function to attach to the address space of a running process.

23. The computer system of claim 19 wherein the software portion configured to call a system object duplication function such that the call simulates origin from the target process further comprises:
a software portion stored in the memory and configured to allocate memory in the address space of the target process; and
a software portion stored in the memory and configured to call a version of the system object duplication function provided by the system for user mode programs, and passing parameters that exist in the allocated user mode memory to the system object duplication function.

24. The computer system of claim 19 further comprising:
a software portion stored in the memory and configured to enumerate all handles concerning at least one target process.

25. The computer system of claim 24 further comprising:
a software portion stored in the memory and configured to receive a request from a source process for at least one duplicate handle of at least one target process; and
a software portion stored in the memory and configured to return the at least one requested duplicate handle to the source process.

* * * * *